May 7, 1957   E. W. HARSLEM ET AL   2,791,401
MOBILE HEATING AND COOLING APPARATUS
Filed Nov. 29, 1955   3 Sheets-Sheet 1

INVENTORS
ERIC W. HARSLEM
LOUIS F. MULLER
BY William R. Wright, Jr.
AGENT

May 7, 1957 E. W. HARSLEM ET AL 2,791,401
MOBILE HEATING AND COOLING APPARATUS
Filed Nov. 29, 1955 3 Sheets-Sheet 2

INVENTORS
ERIC W. HARSLEM
LOUIS F. MULLER
BY *William R. Wright, Jr.*
AGENT

United States Patent Office 2,791,401
Patented May 7, 1957

2,791,401

MOBILE HEATING AND COOLING APPARATUS

Eric W. Harslem, Hackettstown, N. J., and Louis F. Muller, San Diego, Calif., assignors to Reaction Motors, Inc., Denville, N. J., a corporation of New Jersey Application November 29, 1955, Serial No. 549,771

4 Claims. (Cl. 257—9)

The present invention relates to a machine for conditioning a mass of air or other fluid to a predetermined temperature. It relates more particularly to such a device which is combined with a vehicle capable of being towed or otherwise moved about. This invention has been found useful in the temperature conditioning of environmental air and in the temperature conditioning of propellants used in rocket propulsion.

In the field of rocket propulsion, it is often necessary and desirable to test component parts of a rocket engine or a complete missile or aircraft on the ground in an environment similar to that which will be encountered at high altitudes or at high speeds. The temperature to be encountered is probably the most important environmental condition that must be overcome, and it thus becomes essential in testing on the ground that the temperature of the air surrounding the tested device be properly controlled. The present device accomplishes this purpose by providing a means for heating or cooling the air to be used as an environment within a suitable chamber surrounding the rocket propulsion equipment. It also provides for maintaining and providing the correct temperature for the propellants used in the rocket motor. An important feature of the present device lies in its portability, since it is built on a vehicle which can be easily moved about to provide a source of conditioned air or liquids at any convenient location.

It is, therefore, an object of the present invention to provide a mobile self-contained, temperature conditioning unit for the temperature conditioning of environmental air.

It is also an object of the present invention to provide a mobile self-contained unit for conditioning the temperature of fluids such as propellants supplied to a rocket motor.

It is also an object of the present invention to provide a mobile device which is capable of both heating and cooling air or liquids.

The conditioning unit which comprises the present invention is a self-contained portable arrangement with all of its components mounted upon a trailer-type vehicle 10 having front and back wheels 11 with the front ones steerable, and a tow bar 12 by means of which the vehicle can be towed and directed. All of the components mentioned hereinafter in this specification are mounted upon and supported by vehicle 10.

Figure 1:
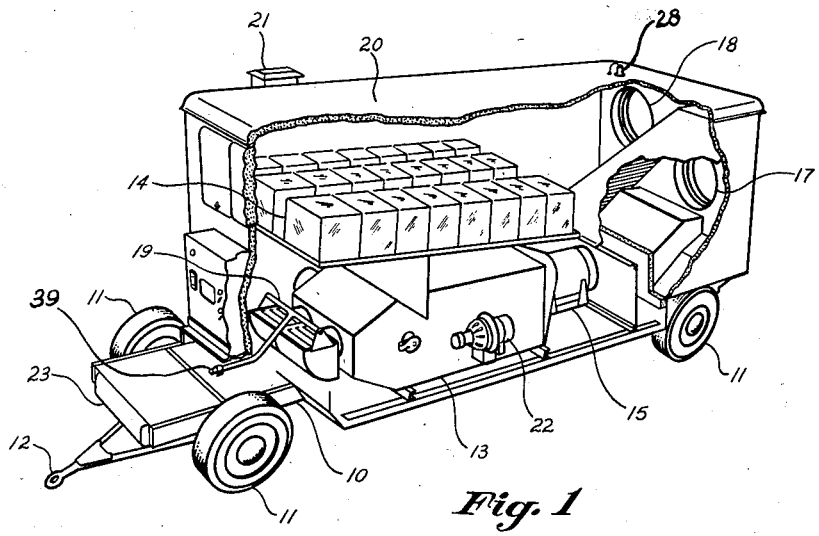
Figure 1 shows a cutaway view of the mobile unit as it is provided for the temperature conditioning of environmental air.
Figure 2:
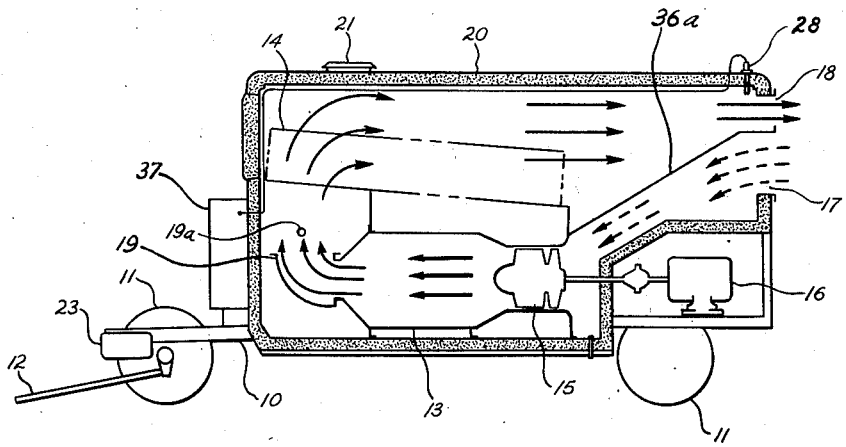
Figure 2 is a diagrammatic view showing the path of air flow through the device of Figure 1.
Figure 3:
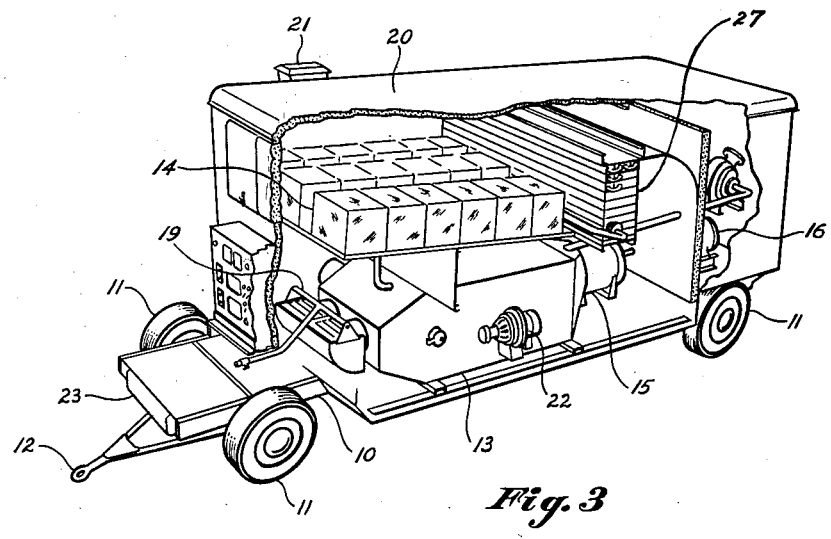
Figure 3 is a cutaway view showing the present invention as it is provided for the temperature conditioning of liquids, such as propellants for a rocket motor.
Figure 4:
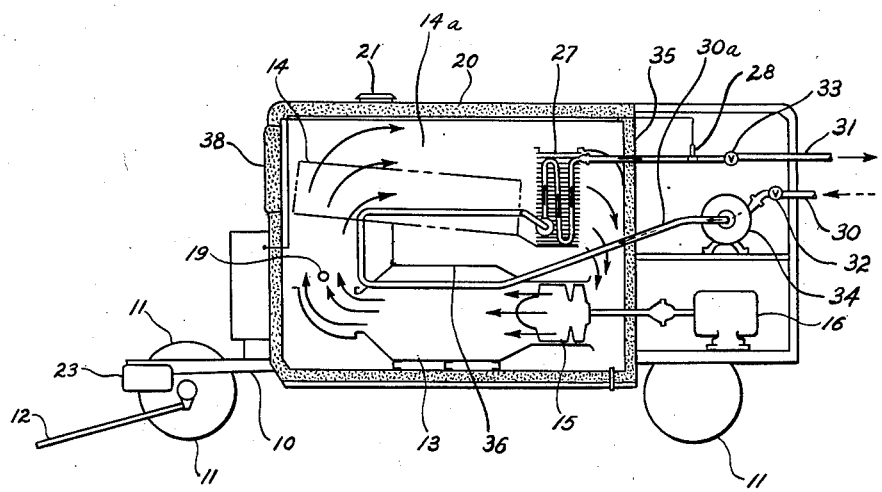
Figure 4 is a schematic diagrammatic view showing the path of propellants through the device of Figure 3.

In Figures 1, 2, 3 and 4 are seen the vehicle 10, a blower 15 driven by electric motor 16, a heater comprising electrically-actuated liquid fuel burner 22 and chamber 13, a cooler or sprayer 19, a cooling chamber 14a for Dry Ice 14 or the like, an inlet 17 for the air or other gaseous fluid to be conditioned, an outlet 18 for the conditioned air, deflectors or baffles 36 which in conjunction with housing 20 define passages for directing the path of flow through or past the various components, and a temperature detector 28 adjacent to the outlet 18 and exposed to the air passing therethrough. In Figures 3 and 4, in addition to the components already described above, is seen a heat exchanger 27, liquid conduits 29 having an inlet 30 and an outlet 31, shutoff valves 32 and 33 in the conduit, a pump 34 and an inner wall 35.

All of the foregoing components are housed in a housing 20 which completely surrounds them on the sides, top and bottom and serves several important functions. It forms a chamber through which the air being conditioned is circulated and directed by the walls of housing 20 and the baffles or separators 36, it is heavily insulated to prevent heat from entering or leaving the chamber through its walls, and it serves to protect the apparatus from the weather. Suitable doors are provided in the sides of housing 20 to allow access to its interior for the purpose of servicing the repairing of the equipment.

With reference to Figure 2, the air to be conditioned enters inlet 17 and is directed by baffle 36a through blower 15. From blower 15 the air is forcibly circulated through heater chamber 13, and then enters sprayer 19 passing over the spray pipe 19a. The air, as shown by the direction of the arrows, then circulates upward through cooling chamber 14a where it comes into contact with Dry Ice 14. The floor of cooling chamber 14a is formed of steel grating having openings in it to allow the air to pass upward through it. The air then moves toward the rear of the vehicle, within the housing, and leaves the vehicle through outlet 18 from which it is carried through suitable conduits to the space being conditioned. As the air reaches outlet 18 it passes over a thermally sensitive element or thermodetector 28 which detects the temperature of the leaving air, and sends an electrical signal to control panel 37 conveniently mounted on the outside of the housing 20.

Figure 5:
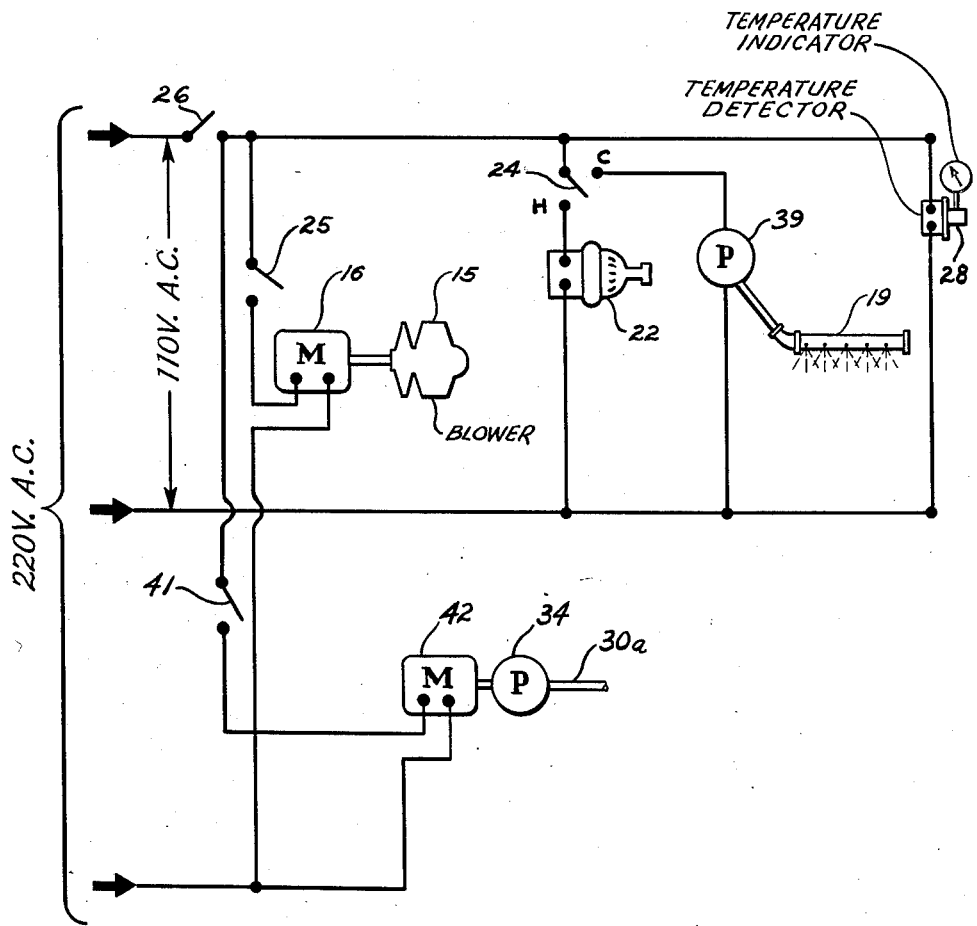
Figure 5 is a schematic wiring diagram showing the electrical control circuit.

Reference to Figure 5 will show that the heater and the sprayer can be operated selectively to either heat or cool the air as desired. This electrical system provides a supply of electric current, a master switch 26 to close or open the supply of electric current to the system, a switch 25 to supply electric current to electric motor 16 which is in turn connected to blower 15, a two-position switch 24 movable to position H or C, i. e. hot or cold, to supply either electric current to the burner 22 to operate it or to supply electric current to pump 39 for pumping liquid coolant such as liquid nitrogen through the sprayer 19. Temperature detector 28 is at all times connected into the electric circuit so long as master switch 26 is closed. A temperature indicator or gauge 28a is operated by temperature detector 28 and is remotely located on the control panel 37. From the foregoing, it will be seen that the air to be conditioned can be passed through the device by operation of the blower through closure of switch 25 where it is heated or cooled at the will of the operator, who operates switch 24 to select either the hot or cold position depending upon the temperature which he reads on temperature indicator 28a. This action can also be controlled very accurately by electrical means well known in the art.

The cooling chamber 14a is filled with Dry Ice only in the event that exceptionally low temperature air is to be provided. In such a case, the Dry Ice 14 is slid into chamber 14a through doors 38 located on the front of housing 20. The entire machine is then allowed to stand in order that the interior of the vehicle and the equipment within it may be pre-cooled. This cooling effect makes it possible for liquid coolant sprayer 19 to bring the temperature down to the desired level more quickly without undue use of the liquid coolant, which in the case of liquid nitrogen would be more expensive than the Dry Ice. In the event that the air is to be conditioned to a temperature higher than that of the prevailing surrounding atmosphere, no Dry Ice is used.

In Figures 3 and 4 is shown an arrangement for circulating a liquid through the machine for the purpose of raising or lowering its temperature. The liquid, which in the case of a rocket propellant might be alcohol for example, is brought into the conditioning machine through inlet 30. From this point, the liquid is forced by pump 34 through pipe or conduit 30a which passes through heater chamber 13 and cooler 19, up through ice chamber 14a, enters heat exchanger 27 and then passes out of the machine to the rocket motor or other device for which the liquid is being temperature conditioned. As the liquid leaves the machine, it comes in contact with temperature detector 28. The system functions in the same manner as described previously in this specification with the exception that propellant pump 34 is electrically operated by closure of a switch 41 which allows current to flow to its motor 42. This circulates the liquid through conduit 30a. Heat exchanger 27 is included in the system to provide additional cooling or heating surface in order that the overall efficiency of the condition may be improved when liquids are being conditioned. As shown by the arrows of Figure 4, conditioning fluid is circulated through the flow path in a closed circuit and the closed conduit 30a extending through the flow path subjects the contained circulating fluid to be conditioned to conditioning by the fluid circulating in the flow path.

A vent and drain 40 is employed in order to prevent any excessive pressure increase within the enclosed housing 20. This becomes especially important in the event that Dry Ice is placed in cooling chamber 14a, since its vaporization will add a considerable quantity of gas to the interior of the housing. Vent 40 is of very small capacity compared with the total volume enclosed by housing 20 and any losses occasioned by the flow of gaseous fluid through it are slight.

While there have been shown and described and pointed out the fundamental novel features of this invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A mobile apparatus for on-the-site conditioning of fluid in the field comprising a wheeled trailer having insulated top, bottom, and side and end walls forming a fluid conditioning chamber, partitions mounted in and so spaced from the walls of said chamber as to form a closed flow path for fluid in said conditioning chamber, said flow path successively including heating means, cooling means, and additional cooling means, means mounted in said chamber for continuously circulating conditioning fluid through said closed path, a closed conduit having an inlet and an outlet into and out of said chamber and extending through said flow path, the portion of said conduit adjacent said outlet being sinuously disposed in said chamber and provided with heat exchange fins on its outer surface, means mounted on said trailer for circulating fluid to be conditioned through said conduit, and means mounted exteriorly of said trailer for selectively controlling said heating and said cooling means during operation of said conduit fluid circulating means.

2. An apparatus as recited in claim 1 wherein said additional cooling means comprises an apertured tray, and Dry Ice disposed on said tray.

3. An apparatus as recited in claim 2 wherein a vent is formed in said chamber to prevent excessive gas pressure therein.

4. An apparatus as recited in claim 2 wherein a combination vent and drain port is formed in the bottom of said chamber to discharge moisture and relieve excessive gas pressures therein.

References Cited in the file of this patent
UNITED STATES PATENTS

| | | |
|---|---|---|
| 1,859,613 | Bailey | May 24, 1932 |
| 1,874,964 | Goes | Aug. 30, 1932 |
| 2,050,824 | Atherton | Aug. 11, 1936 |
| 2,133,872 | Roessler | Oct. 18, 1938 |
| 2,245,369 | Smith | June 10, 1941 |